(12) United States Patent
Jinkins et al.

(10) Patent No.: US 9,939,526 B2
(45) Date of Patent: Apr. 10, 2018

(54) DISPLAY SYSTEM AND METHOD USING WEATHER RADAR SENSING

(71) Applicants: Richard D. Jinkins, Rewey, WI (US); Richard M. Rademaker, Rijswijk (NL); Daniel L. Woodell, Cedar Rapids, IA (US); Sergey B. Shishlov, Melbourne, IA (US)

(72) Inventors: Richard D. Jinkins, Rewey, WI (US); Richard M. Rademaker, Rijswijk (NL); Daniel L. Woodell, Cedar Rapids, IA (US); Sergey B. Shishlov, Melbourne, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 13 days.

(21) Appl. No.: 14/536,330

(22) Filed: Nov. 7, 2014

(65) Prior Publication Data

US 2016/0131739 A1 May 12, 2016

(51) Int. Cl.
*G01S 13/95* (2006.01)
*G01S 7/12* (2006.01)

(52) U.S. Cl.
CPC .............. *G01S 13/953* (2013.01); *G01S 7/12* (2013.01)

(58) Field of Classification Search
CPC ................................. G01S 13/953; G01S 7/12
USPC ....................................................... 342/26 B
See application file for complete search history.

(56) References Cited

U.S. PATENT DOCUMENTS

| | | | |
|---|---|---|---|
| 2,416,155 A | 2/1947 | Chubb | |
| 2,849,184 A | 8/1958 | Arden et al. | |
| 2,929,059 A | 3/1960 | Parker | |
| 2,930,035 A | 3/1960 | Altekruse | |
| 2,948,892 A | 8/1960 | White | |
| 2,965,894 A | 12/1960 | Sweeney | |
| 2,994,966 A | 8/1961 | Senitsky et al. | |

(Continued)

FOREIGN PATENT DOCUMENTS

| | | |
|---|---|---|
| DE | 196 49 838 | 4/1998 |
| DE | 19949737 A1 | 4/2001 |

(Continued)

OTHER PUBLICATIONS

U.S. Appl. No. 11/851,323, filed Sep. 6, 2007, McCusker.

(Continued)

*Primary Examiner* — Tashiana R Adams
*Assistant Examiner* — Helena H Seraydaryan
(74) *Attorney, Agent, or Firm* — Donna P. Suchy; Daniel M. Barbieri

(57) ABSTRACT

An enhanced vision method uses or an enhanced vision system includes an onboard weather radar system configured to improve angular resolution and/or resolution in range. The onboard weather radar system generates image data representative of the external scene topography of a runway environment associated with radar returns received by the onboard weather radar system. The radar returns are in an X-band or a C-band. The enhanced vision system also includes a display in communication with the onboard weather radar system and is configured to display an image associated with the image data that is generated by the onboard weather radar system. The enhanced vision system can also be used as an enhanced flight vision system.

17 Claims, 4 Drawing Sheets

(56) References Cited

U.S. PATENT DOCUMENTS

| | | |
|---|---|---|
| 3,031,660 A | 4/1962 | Young |
| 3,049,702 A | 8/1962 | Schreitmueller |
| 3,064,252 A | 11/1962 | Varela |
| 3,070,795 A | 12/1962 | Chambers |
| 3,071,766 A | 1/1963 | Fenn |
| 3,072,903 A | 1/1963 | Meyer |
| 3,089,801 A | 5/1963 | Tierney et al. |
| 3,107,351 A | 10/1963 | Milam |
| 3,113,310 A | 12/1963 | Standing |
| 3,129,425 A | 4/1964 | Sanner |
| 3,153,234 A | 10/1964 | Begeman et al. |
| 3,175,215 A | 3/1965 | Blasberg et al. |
| 3,212,088 A | 10/1965 | Alexander et al. |
| 3,221,328 A | 11/1965 | Walter |
| 3,241,141 A | 3/1966 | Wall |
| 3,274,593 A | 9/1966 | Varela et al. |
| 3,325,807 A | 6/1967 | Burns et al. |
| 3,334,344 A | 8/1967 | Colby, Jr. |
| 3,339,199 A | 8/1967 | Pichafroy |
| 3,373,423 A | 3/1968 | Levy |
| 3,397,397 A | 8/1968 | Barney |
| 3,448,450 A | 6/1969 | Alfandari et al. |
| 3,618,090 A | 11/1971 | Garrison |
| 3,680,094 A | 7/1972 | Bayle et al. |
| 3,716,855 A | 2/1973 | Asam |
| 3,739,380 A | 6/1973 | Burdic et al. |
| 3,781,878 A | 12/1973 | Kirkpatrick |
| 3,810,175 A | 5/1974 | Bell |
| 3,815,132 A | 6/1974 | Case et al. |
| 3,816,718 A | 6/1974 | Hall et al. |
| 3,851,758 A | 12/1974 | Makhijani et al. |
| 3,866,222 A | 2/1975 | Young |
| 3,885,237 A | 5/1975 | Kirkpatrick |
| 3,956,749 A | 5/1976 | Magorian |
| 4,024,537 A | 5/1977 | Hart |
| 4,058,701 A | 11/1977 | Gruber et al. |
| 4,058,710 A | 11/1977 | Altmann |
| 4,063,218 A | 12/1977 | Basov et al. |
| 4,235,951 A | 11/1980 | Swarovski |
| 4,277,845 A | 7/1981 | Smith et al. |
| 4,405,986 A | 9/1983 | Gray |
| 4,435,707 A | 3/1984 | Clark |
| 4,481,519 A | 11/1984 | Margerum |
| 4,532,515 A | 7/1985 | Cantrell et al. |
| 4,594,676 A | 6/1986 | Breiholz et al. |
| 4,595,925 A | 6/1986 | Hansen |
| 4,598,292 A | 7/1986 | Devino |
| 4,628,318 A | 12/1986 | Alitz |
| 4,646,244 A | 2/1987 | Bateman et al. |
| 4,649,388 A | 3/1987 | Atlas |
| 4,654,665 A | 3/1987 | Kiuchi et al. |
| 4,685,149 A | 8/1987 | Smith et al. |
| 4,760,396 A | 7/1988 | Barney et al. |
| 4,828,382 A | 5/1989 | Vermilion |
| 4,843,398 A | 6/1989 | Houston et al. |
| 4,912,477 A | 3/1990 | Lory et al. |
| 4,914,436 A | 4/1990 | Bateman et al. |
| 4,924,401 A | 5/1990 | Bice et al. |
| 4,939,513 A | 7/1990 | Paterson et al. |
| 4,951,059 A | 8/1990 | Taylor, Jr. |
| 4,953,972 A | 9/1990 | Zuk |
| 4,965,573 A | 10/1990 | Gallagher et al. |
| 4,987,419 A | 1/1991 | Salkeld |
| 5,045,855 A | 9/1991 | Moreira |
| 5,047,779 A | 9/1991 | Hager |
| 5,047,781 A | 9/1991 | Bleakney |
| 5,049,886 A | 9/1991 | Seitz et al. |
| 5,166,688 A | 11/1991 | Moreira |
| 5,173,703 A | 12/1992 | Mangiapane et al. |
| 5,175,554 A | 12/1992 | Mangiapane et al. |
| 5,198,819 A | 3/1993 | Susnjara |
| 5,202,690 A | 4/1993 | Frederick |
| 5,247,303 A | 9/1993 | Cornelius et al. |
| 5,273,553 A | 12/1993 | Hoshi et al. |
| 5,311,183 A | 5/1994 | Mathews et al. |
| 5,329,391 A | 7/1994 | Miyamoto et al. |
| 5,332,998 A | 7/1994 | Avignon et al. |
| 5,345,241 A | 9/1994 | Huddle |
| 5,365,356 A | 11/1994 | McFadden |
| 5,383,457 A * | 1/1995 | Cohen ............... G01S 7/52028 600/443 |
| 5,442,364 A | 8/1995 | Lee et al. |
| 5,539,409 A | 7/1996 | Mathews et al. |
| 5,559,515 A | 9/1996 | Alimena et al. |
| 5,559,518 A | 9/1996 | Didomizio |
| 5,566,840 A | 10/1996 | Waldner et al. |
| 5,592,178 A | 1/1997 | Chang et al. |
| 5,678,303 A | 10/1997 | Wichmann |
| 5,736,957 A | 4/1998 | Raney |
| 5,820,080 A | 10/1998 | Eschenbach |
| 5,828,332 A | 10/1998 | Frederick |
| 5,831,570 A * | 11/1998 | Ammar ............... F41G 7/2226 342/149 |
| 5,839,080 A | 11/1998 | Muller et al. |
| 5,867,119 A | 2/1999 | Corrubia et al. |
| 5,894,286 A | 4/1999 | Morand et al. |
| 5,918,517 A | 7/1999 | Malapert et al. |
| 5,920,276 A | 7/1999 | Frederick |
| 5,923,279 A | 7/1999 | Bamler et al. |
| 5,936,575 A | 8/1999 | Azzarelli et al. |
| 5,942,062 A | 8/1999 | Hassall et al. |
| 5,945,926 A | 8/1999 | Ammar et al. |
| 5,950,512 A | 9/1999 | Fields |
| 5,959,762 A | 9/1999 | Bandettini et al. |
| 5,978,715 A | 11/1999 | Briffe et al. |
| 6,002,347 A | 12/1999 | Daly et al. |
| 6,023,240 A | 2/2000 | Sutton |
| 6,061,016 A | 5/2000 | Lupinski et al. |
| 6,061,022 A | 5/2000 | Menegozzi et al. |
| 6,064,942 A | 5/2000 | Johnson et al. |
| 6,075,484 A | 6/2000 | Daniel et al. |
| 6,092,009 A | 7/2000 | Glover |
| 6,112,141 A | 8/2000 | Briffe et al. |
| 6,112,570 A | 9/2000 | Hruschak |
| 6,122,570 A | 9/2000 | Muller et al. |
| 6,127,944 A | 10/2000 | Daly et al. |
| 6,128,066 A | 10/2000 | Yokozeki |
| 6,128,553 A | 10/2000 | Gordon et al. |
| 6,138,060 A | 10/2000 | Conner et al. |
| 6,150,901 A | 11/2000 | Auken |
| 6,154,151 A | 11/2000 | McElreath et al. |
| 6,154,169 A | 11/2000 | Kuntman |
| 6,157,339 A | 12/2000 | Sato et al. |
| 6,157,891 A | 12/2000 | Lin |
| 6,163,021 A | 12/2000 | Mickelson |
| 6,166,661 A | 12/2000 | Anderson et al. |
| 6,169,770 B1 | 1/2001 | Henely |
| 6,178,391 B1 | 1/2001 | Anderson et al. |
| 6,184,816 B1 | 2/2001 | Zheng et al. |
| 6,188,330 B1 | 2/2001 | Glover |
| 6,194,980 B1 | 2/2001 | Thon |
| 6,199,008 B1 | 3/2001 | Aratow et al. |
| 6,201,494 B1 | 3/2001 | Kronfeld |
| 6,204,806 B1 | 3/2001 | Hoech |
| 6,205,400 B1 | 3/2001 | Lin |
| 6,208,284 B1 | 3/2001 | Woodell et al. |
| 6,219,592 B1 | 4/2001 | Muller et al. |
| 6,233,522 B1 | 5/2001 | Morici |
| 6,236,351 B1 | 5/2001 | Conner et al. |
| 6,259,400 B1 | 7/2001 | Higgins et al. |
| 6,266,114 B1 | 7/2001 | Skarohlid |
| 6,278,799 B1 | 8/2001 | Hoffman |
| 6,281,832 B1 | 8/2001 | McElreath |
| 6,285,298 B1 | 9/2001 | Gordon |
| 6,285,337 B1 | 9/2001 | West et al. |
| 6,285,926 B1 | 9/2001 | Weiler et al. |
| 6,289,277 B1 | 9/2001 | Feyereisen et al. |
| 6,311,108 B1 | 10/2001 | Ammar et al. |
| 6,317,468 B1 | 11/2001 | Meyer |
| 6,317,690 B1 | 11/2001 | Gia |
| 6,317,872 B1 | 11/2001 | Gee et al. |
| 6,340,946 B1 | 1/2002 | Wolfson et al. |
| 6,345,127 B1 | 2/2002 | Mitchell |
| 6,359,585 B1 | 3/2002 | Bechman et al. |

(56) References Cited

U.S. PATENT DOCUMENTS

| | | |
|---|---|---|
| 6,366,013 B1 | 4/2002 | Leenders et al. |
| 6,373,418 B1 | 4/2002 | Abbey |
| 6,374,286 B1 | 4/2002 | Gee et al. |
| 6,377,202 B1 | 4/2002 | Kropfli et al. |
| 6,377,892 B1 | 4/2002 | Johnson et al. |
| 6,388,607 B1 | 5/2002 | Woodell |
| 6,388,608 B1 | 5/2002 | Woodell et al. |
| 6,388,724 B1 | 5/2002 | Campbell et al. |
| 6,389,354 B1 | 5/2002 | Hicks et al. |
| 6,401,038 B2 | 6/2002 | Gia |
| 6,411,890 B1 | 6/2002 | Zimmerman |
| 6,421,000 B1 | 7/2002 | McDowell |
| 6,421,603 B1 | 7/2002 | Pratt et al. |
| 6,424,288 B1 | 7/2002 | Woodell |
| 6,426,717 B1 | 7/2002 | Maloratsky |
| 6,426,720 B1 | 7/2002 | Ross et al. |
| 6,427,122 B1 | 7/2002 | Lin |
| 6,441,773 B1 | 8/2002 | Kelly et al. |
| 6,445,310 B1 | 9/2002 | Bateman et al. |
| 6,448,922 B1 | 9/2002 | Kelly |
| 6,452,511 B1 | 9/2002 | Kelly et al. |
| 6,456,236 B1 | 9/2002 | Hauck et al. |
| 6,456,238 B1 | 9/2002 | Posey |
| 6,462,703 B2 | 10/2002 | Hedrick |
| 6,473,026 B1 | 10/2002 | Ali-Mehenni et al. |
| 6,473,037 B2 | 10/2002 | Vail et al. |
| 6,473,240 B1 | 10/2002 | Dehmlow |
| 6,481,482 B1 | 11/2002 | Shimotomai |
| 6,492,934 B1 | 12/2002 | Hwang et al. |
| 6,501,424 B1 | 12/2002 | Haendel et al. |
| 6,512,476 B1 | 1/2003 | Woodell |
| 6,512,527 B1 | 1/2003 | Barber et al. |
| 6,516,272 B2 | 2/2003 | Lin |
| 6,516,283 B2 | 2/2003 | McCall et al. |
| 6,520,056 B1 | 2/2003 | Nemeth et al. |
| 6,525,674 B1 | 2/2003 | Kelly et al. |
| 6,531,669 B1 | 3/2003 | Miller et al. |
| 6,549,161 B1 | 4/2003 | Woodell |
| 6,567,728 B1 | 5/2003 | Kelly et al. |
| 6,574,030 B1 | 6/2003 | Mosier |
| 6,577,947 B1 | 6/2003 | Kronfeld et al. |
| 6,590,528 B1 | 7/2003 | Dewulf |
| 6,591,171 B1 | 7/2003 | Ammar et al. |
| 6,593,875 B2 | 7/2003 | Bergin et al. |
| 6,600,443 B2 | 7/2003 | Landt |
| 6,603,425 B1 | 8/2003 | Woodell |
| 6,614,057 B2 | 9/2003 | Silvernail et al. |
| 6,650,275 B1 | 11/2003 | Kelly et al. |
| 6,650,291 B1 | 11/2003 | West et al. |
| 6,653,947 B2 | 11/2003 | Dwyer et al. |
| 6,667,710 B2 | 12/2003 | Cornell et al. |
| 6,681,668 B1 | 1/2004 | Smirle |
| 6,690,298 B1 | 2/2004 | Barber et al. |
| 6,690,299 B1 | 2/2004 | Suiter |
| 6,690,317 B2 | 2/2004 | Szeto et al. |
| 6,697,008 B1 | 2/2004 | Sternowski |
| 6,697,012 B2 | 2/2004 | Lodwig et al. |
| 6,710,663 B1 | 3/2004 | Berquist |
| 6,714,186 B1 | 3/2004 | Mosier et al. |
| 6,724,344 B1 | 4/2004 | Stockmaster et al. |
| 6,731,236 B1 | 5/2004 | Hager et al. |
| 6,738,011 B1 | 5/2004 | Evans |
| 6,739,929 B2 | 5/2004 | Furukawa et al. |
| 6,741,203 B1 | 5/2004 | Woodell |
| 6,741,208 B1 * | 5/2004 | West .................. H01Q 3/02 342/155 |
| 6,744,382 B1 | 6/2004 | Lapis et al. |
| 6,744,408 B1 | 6/2004 | Stockmaster |
| 6,757,624 B1 | 6/2004 | Hwang et al. |
| 6,760,155 B2 | 7/2004 | Murayama et al. |
| 6,771,626 B1 | 8/2004 | Golubiewski et al. |
| 6,782,392 B1 | 8/2004 | Weinberger et al. |
| 6,799,095 B1 | 9/2004 | Owen et al. |
| 6,803,245 B2 | 10/2004 | Auch et al. |
| 6,804,614 B1 | 10/2004 | McGraw et al. |
| 6,806,846 B1 | 10/2004 | West |
| 6,807,538 B1 | 10/2004 | Weinberger et al. |
| 6,813,777 B1 | 11/2004 | Weinberger et al. |
| 6,819,983 B1 | 11/2004 | McGraw |
| 6,822,617 B1 | 11/2004 | Mather et al. |
| 6,825,804 B1 | 11/2004 | Doty |
| 6,832,538 B1 | 12/2004 | Hwang |
| 6,839,017 B1 | 1/2005 | Dillman |
| 6,842,288 B1 | 1/2005 | Liu et al. |
| 6,850,185 B1 | 2/2005 | Woodell |
| 6,862,323 B1 | 3/2005 | Loper |
| 6,862,501 B2 | 3/2005 | He |
| 6,865,452 B2 | 3/2005 | Burdon |
| 6,879,280 B1 | 4/2005 | Bull et al. |
| 6,879,886 B2 | 4/2005 | Wilkins et al. |
| 6,882,302 B1 | 4/2005 | Woodell et al. |
| 6,908,202 B2 | 6/2005 | Graf et al. |
| 6,917,396 B2 | 7/2005 | Hiraishi et al. |
| 6,918,134 B1 | 7/2005 | Sherlock et al. |
| 6,933,885 B1 | 8/2005 | Stockmaster et al. |
| 6,938,258 B1 | 8/2005 | Weinberger et al. |
| 6,950,062 B1 | 9/2005 | Mather et al. |
| 6,959,057 B1 | 10/2005 | Tuohino |
| 6,972,727 B1 | 12/2005 | West et al. |
| 6,977,608 B1 | 12/2005 | Anderson et al. |
| 6,984,545 B2 | 1/2006 | Grigg et al. |
| 6,990,022 B2 | 1/2006 | Morikawa et al. |
| 6,992,614 B1 | 1/2006 | Joyce |
| 6,995,726 B1 | 2/2006 | West et al. |
| 6,998,648 B2 | 2/2006 | Silvernail |
| 6,998,908 B1 | 2/2006 | Sternowski |
| 6,999,022 B1 | 2/2006 | Vesel et al. |
| 6,999,027 B1 | 2/2006 | Stockmaster |
| 7,002,546 B1 | 2/2006 | Stuppi et al. |
| 7,010,398 B2 | 3/2006 | Wilkins et al. |
| 7,023,375 B2 | 4/2006 | Klausing et al. |
| 7,026,956 B1 | 4/2006 | Wenger et al. |
| 7,028,304 B1 | 4/2006 | Weinberger et al. |
| 7,030,945 B2 | 4/2006 | Umemoto et al. |
| 7,034,753 B1 | 4/2006 | Elsallal et al. |
| 7,042,387 B2 | 5/2006 | Ridenour et al. |
| 7,053,796 B1 | 5/2006 | Barber |
| 7,057,549 B2 | 6/2006 | Block |
| 7,064,680 B2 | 6/2006 | Reynolds et al. |
| 7,069,120 B1 | 6/2006 | Koenck et al. |
| 7,089,092 B1 | 8/2006 | Wood et al. |
| 7,092,645 B1 | 8/2006 | Sternowski |
| 7,098,913 B1 | 8/2006 | Etherington et al. |
| 7,109,912 B1 | 9/2006 | Paramore et al. |
| 7,109,913 B1 | 9/2006 | Paramore et al. |
| 7,123,260 B2 | 10/2006 | Brust |
| 7,129,885 B1 | 10/2006 | Woodell et al. |
| 7,145,501 B1 | 12/2006 | Manfred et al. |
| 7,148,816 B1 | 12/2006 | Carrico |
| 7,151,507 B1 | 12/2006 | Herting |
| 7,158,072 B1 | 1/2007 | Venkatachalam et al. |
| 7,161,525 B1 | 1/2007 | Finley et al. |
| 7,170,446 B1 | 1/2007 | West et al. |
| 7,170,959 B1 | 1/2007 | Abbey |
| 7,180,476 B1 | 2/2007 | Guell et al. |
| 7,191,406 B1 | 3/2007 | Barber et al. |
| 7,196,329 B1 | 3/2007 | Wood et al. |
| 7,205,933 B1 | 4/2007 | Snodgrass |
| 7,209,070 B2 | 4/2007 | Gilliland et al. |
| 7,212,216 B2 | 5/2007 | He et al. |
| 7,218,268 B2 | 5/2007 | Vandenberg |
| 7,219,011 B1 | 5/2007 | Barber |
| 7,242,343 B1 | 7/2007 | Woodell |
| 7,242,345 B2 | 7/2007 | Raestad et al. |
| 7,250,903 B1 | 7/2007 | McDowell |
| 7,265,710 B2 | 9/2007 | Deagro |
| 7,269,657 B1 | 9/2007 | Alexander et al. |
| 7,272,472 B1 | 9/2007 | McElreath |
| 7,273,403 B2 | 9/2007 | Yokota et al. |
| 7,280,068 B2 | 10/2007 | Lee et al. |
| 7,289,058 B2 | 10/2007 | Shima |
| 7,292,178 B1 | 11/2007 | Woodell et al. |
| 7,292,180 B2 | 11/2007 | Schober |
| 7,295,150 B2 | 11/2007 | Burlet et al. |

(56) References Cited

U.S. PATENT DOCUMENTS

| | | |
|---|---|---|
| 7,295,901 B1 | 11/2007 | Little et al. |
| 7,301,496 B2 | 11/2007 | Honda et al. |
| 7,307,576 B1 | 12/2007 | Koenigs |
| 7,307,577 B1 | 12/2007 | Kronfeld et al. |
| 7,307,583 B1 | 12/2007 | Woodell et al. |
| 7,312,725 B2 | 12/2007 | Berson et al. |
| 7,312,743 B2 | 12/2007 | Ridenour et al. |
| 7,317,427 B2 | 1/2008 | Pauplis et al. |
| 7,321,332 B2 | 1/2008 | Focke et al. |
| 7,337,043 B2 | 2/2008 | Bull |
| 7,349,154 B2 | 3/2008 | Aiura et al. |
| 7,352,292 B2 | 4/2008 | Alter et al. |
| 7,361,240 B2 | 4/2008 | Kim |
| 7,372,394 B1 | 5/2008 | Woodell et al. |
| 7,373,223 B2 | 5/2008 | Murphy |
| 7,375,678 B2 | 5/2008 | Feyereisen et al. |
| 7,379,014 B1 | 5/2008 | Woodell et al. |
| 7,379,796 B2 | 5/2008 | Walsdorf et al. |
| 7,381,110 B1 | 6/2008 | Sampica et al. |
| 7,417,578 B1 | 8/2008 | Woodell et al. |
| 7,417,579 B1 | 8/2008 | Woodell |
| 7,423,578 B1 | 9/2008 | Tietjen |
| 7,446,697 B2 | 11/2008 | Burlet et al. |
| 7,446,938 B2 | 11/2008 | Miyatake et al. |
| 7,452,258 B1 | 11/2008 | Marzen et al. |
| 7,474,262 B2 | 1/2009 | Alland |
| 7,479,920 B2 | 1/2009 | Niv |
| 7,486,220 B1 | 2/2009 | Kronfeld et al. |
| 7,486,291 B2 | 2/2009 | Berson et al. |
| 7,492,304 B1 | 2/2009 | Woodell et al. |
| 7,492,305 B1 | 2/2009 | Woodell et al. |
| 7,515,087 B1 | 4/2009 | Woodell et al. |
| 7,515,088 B1 | 4/2009 | Woodell et al. |
| 7,525,448 B1 | 4/2009 | Wilson et al. |
| 7,528,765 B1 | 5/2009 | Woodell et al. |
| 7,528,915 B2 | 5/2009 | Choi et al. |
| 7,541,970 B1 | 6/2009 | Godfrey et al. |
| 7,541,971 B1 | 6/2009 | Woodell et al. |
| 7,551,451 B2 | 6/2009 | Kim et al. |
| 7,557,735 B1 | 7/2009 | Woodell et al. |
| 7,566,254 B2 | 7/2009 | Sampica et al. |
| 7,570,177 B2 | 8/2009 | Reynolds et al. |
| 7,576,680 B1 | 8/2009 | Woodell |
| 7,603,209 B2 | 10/2009 | Dwyer et al. |
| 7,609,200 B1 | 10/2009 | Woodell et al. |
| 7,612,706 B2 | 11/2009 | Honda et al. |
| 7,616,150 B1 | 11/2009 | Woodell |
| 7,633,428 B1 | 12/2009 | McCusker et al. |
| 7,633,430 B1 | 12/2009 | Wichgers et al. |
| 7,633,584 B2 | 12/2009 | Umemoto et al. |
| 7,639,175 B1 | 12/2009 | Woodell |
| 7,664,601 B2 | 2/2010 | Daly, Jr. |
| 7,675,461 B1 | 3/2010 | McCusker et al. |
| 7,693,621 B1 | 4/2010 | Chamas |
| 7,696,921 B1 | 4/2010 | Finley et al. |
| 7,714,767 B1 | 5/2010 | Kronfeld et al. |
| 7,733,264 B1 | 6/2010 | Woodell et al. |
| 7,783,427 B1 | 8/2010 | Woodell et al. |
| 7,783,429 B2 | 8/2010 | Walden et al. |
| 7,791,529 B2 | 9/2010 | Filias et al. |
| 7,808,422 B1 | 10/2010 | Woodell et al. |
| 7,814,676 B2 | 10/2010 | Sampica et al. |
| 7,843,380 B1 | 11/2010 | Woodell |
| 7,859,448 B1 | 12/2010 | Woodell et al. |
| 7,859,449 B1 | 12/2010 | Woodell et al. |
| 7,864,103 B2 | 1/2011 | Weber et al. |
| 7,868,811 B1 | 1/2011 | Woodell et al. |
| 7,872,594 B1 | 1/2011 | Vesel |
| 7,889,117 B1 | 2/2011 | Woodell et al. |
| 7,889,118 B1 | 2/2011 | Finley et al. |
| 7,927,440 B2 | 4/2011 | Matsuhira |
| 7,929,086 B2 | 4/2011 | Toyama et al. |
| 7,965,223 B1 | 6/2011 | McCusker |
| 7,965,225 B1 | 6/2011 | Dickerson et al. |
| 8,035,547 B1 | 10/2011 | Flanigan et al. |
| 8,038,498 B2 | 10/2011 | Miyauchi et al. |
| 8,045,098 B2 | 10/2011 | Kitagawa et al. |
| 8,059,025 B2 | 11/2011 | D'Addio |
| 8,068,984 B2 | 11/2011 | Smith et al. |
| 8,072,368 B1 | 12/2011 | Woodell |
| 8,077,078 B1 | 12/2011 | Woodell et al. |
| 8,102,487 B2 | 1/2012 | Kitagawa et al. |
| 8,118,075 B2 | 2/2012 | Sampica et al. |
| 8,137,498 B2 | 3/2012 | Sampica et al. |
| 8,140,223 B2 | 3/2012 | Whitehead et al. |
| 8,159,464 B1 | 4/2012 | Gribble et al. |
| 8,232,917 B2 | 7/2012 | Scherzinger et al. |
| 8,296,065 B2 | 10/2012 | Haynie et al. |
| 8,373,580 B2 | 2/2013 | Bunch et al. |
| 8,410,975 B1 | 4/2013 | Bell et al. |
| 8,477,062 B1 | 7/2013 | Kanellis |
| 8,486,535 B1 | 7/2013 | Nemeth et al. |
| 8,493,241 B2 | 7/2013 | He |
| 8,515,600 B1 | 8/2013 | McCusker |
| 8,540,002 B2 | 9/2013 | Sampica et al. |
| 8,558,731 B1 | 10/2013 | Woodell |
| 8,576,112 B2 | 11/2013 | Garrec et al. |
| 8,583,315 B2 | 11/2013 | Whitehead et al. |
| 8,594,879 B2 | 11/2013 | Roberge et al. |
| 8,603,288 B2 | 12/2013 | Sampica et al. |
| 8,634,993 B2 | 1/2014 | McClure et al. |
| 8,639,416 B2 | 1/2014 | Jones et al. |
| 8,643,533 B1 | 2/2014 | Woodell et al. |
| 8,691,043 B2 | 4/2014 | Sampica et al. |
| 8,717,226 B2 | 5/2014 | Bon et al. |
| 8,773,301 B1 | 7/2014 | Woodell |
| 8,896,480 B1 | 11/2014 | Wilson et al. |
| 8,909,471 B1 | 12/2014 | Jinkins et al. |
| 8,917,191 B1 | 12/2014 | Tiana et al. |
| 8,936,057 B2 | 1/2015 | Sampica et al. |
| 9,354,633 B1 | 5/2016 | McCusker et al. |
| 2001/0023390 A1 | 9/2001 | Gia |
| 2001/0050372 A1 | 12/2001 | Krijn et al. |
| 2001/0053648 A1 | 12/2001 | Furukawa et al. |
| 2002/0039070 A1 | 4/2002 | Ververs et al. |
| 2002/0111717 A1 | 8/2002 | Scherzinger et al. |
| 2002/0116125 A1 | 8/2002 | Lin |
| 2002/0116126 A1 | 8/2002 | Lin |
| 2002/0158256 A1 | 10/2002 | Yamada et al. |
| 2002/0179229 A1 | 12/2002 | Chuzles |
| 2002/0185600 A1 | 12/2002 | Kerr |
| 2002/0187284 A1 | 12/2002 | Kinoshita et al. |
| 2003/0021491 A1 | 1/2003 | Brust |
| 2003/0038916 A1 | 2/2003 | Nakano et al. |
| 2003/0043315 A1 | 3/2003 | Umemoto et al. |
| 2003/0071828 A1 | 4/2003 | Wilkins et al. |
| 2003/0089214 A1 | 5/2003 | Fukuta et al. |
| 2003/0093187 A1 | 5/2003 | Walker |
| 2003/0102999 A1 | 6/2003 | Bergin et al. |
| 2003/0156238 A1 | 8/2003 | Hiraishi et al. |
| 2003/0160718 A1 | 8/2003 | Nagasaku |
| 2003/0174396 A1 | 9/2003 | Murayama et al. |
| 2003/0180528 A1 | 9/2003 | Flosenzier et al. |
| 2003/0189606 A1 | 10/2003 | Moon et al. |
| 2003/0195672 A1 | 10/2003 | He |
| 2003/0216859 A1 | 11/2003 | Martell et al. |
| 2003/0222887 A1 | 12/2003 | Wilkins et al. |
| 2004/0044445 A1 | 3/2004 | Burdon |
| 2004/0059473 A1 | 3/2004 | He |
| 2004/0066645 A1 | 4/2004 | Graf et al. |
| 2004/0072575 A1 | 4/2004 | Young et al. |
| 2004/0083038 A1 | 4/2004 | He |
| 2004/0145499 A1 | 7/2004 | Schmidt et al. |
| 2004/0160341 A1 | 8/2004 | Feyereisen et al. |
| 2004/0160364 A1 | 8/2004 | Regev |
| 2004/0181318 A1 | 9/2004 | Redmond et al. |
| 2004/0264549 A1 | 12/2004 | Hoole |
| 2005/0004748 A1 | 1/2005 | Pinto et al. |
| 2005/0052451 A1 | 3/2005 | Servantie |
| 2005/0126679 A1 | 6/2005 | Kim |
| 2005/0136625 A1 | 6/2005 | Henseler et al. |
| 2005/0150289 A1 | 7/2005 | Osborne |
| 2005/0174350 A1 | 8/2005 | Ridenour et al. |
| 2005/0200502 A1 | 9/2005 | Reusser et al. |

(56) References Cited

U.S. PATENT DOCUMENTS

| | | | |
|---|---|---|---|
| 2005/0225481 A1* | 10/2005 | Bonthron | G01S 7/032 342/175 |
| 2005/0230563 A1 | 10/2005 | Corcoran, III | |
| 2006/0004497 A1 | 1/2006 | Bull | |
| 2006/0097895 A1 | 5/2006 | Reynolds et al. | |
| 2006/0098452 A1 | 5/2006 | Choi et al. | |
| 2006/0164284 A1 | 7/2006 | Pauplis et al. | |
| 2006/0207967 A1 | 9/2006 | Bocko et al. | |
| 2006/0215265 A1 | 9/2006 | Miyatake et al. | |
| 2006/0227012 A1 | 10/2006 | He | |
| 2006/0244636 A1 | 11/2006 | Rye et al. | |
| 2006/0245171 A1 | 11/2006 | Kim et al. | |
| 2006/0290253 A1 | 12/2006 | Yeo et al. | |
| 2006/0290531 A1 | 12/2006 | Reynolds et al. | |
| 2007/0001897 A1 | 1/2007 | Alland | |
| 2007/0002078 A1 | 1/2007 | He et al. | |
| 2007/0008214 A1 | 1/2007 | Wasiewicz | |
| 2007/0013575 A1 | 1/2007 | Lee et al. | |
| 2007/0018887 A1 | 1/2007 | Feyereisen et al. | |
| 2007/0032951 A1 | 2/2007 | Tanenhaus et al. | |
| 2007/0060063 A1 | 3/2007 | Wright et al. | |
| 2007/0146364 A1 | 6/2007 | Aspen | |
| 2007/0171094 A1 | 7/2007 | Alter et al. | |
| 2007/0176794 A1 | 8/2007 | Feyereisen et al. | |
| 2007/0179684 A1 | 8/2007 | He | |
| 2007/0228586 A1 | 10/2007 | Merrill et al. | |
| 2007/0247350 A1 | 10/2007 | Ryan | |
| 2007/0279253 A1 | 12/2007 | Priest | |
| 2007/0297736 A1 | 12/2007 | Sherman et al. | |
| 2008/0018524 A1 | 1/2008 | Christianson | |
| 2008/0051947 A1 | 2/2008 | Kemp | |
| 2008/0074308 A1 | 3/2008 | Becker et al. | |
| 2008/0111731 A1 | 5/2008 | Hubbard et al. | |
| 2008/0145610 A1 | 6/2008 | Muller et al. | |
| 2008/0180351 A1 | 7/2008 | He | |
| 2008/0305721 A1 | 12/2008 | Ohashi et al. | |
| 2009/0021397 A1 | 1/2009 | Wipf et al. | |
| 2009/0040070 A1 | 2/2009 | Alter et al. | |
| 2009/0040772 A1 | 2/2009 | Laney | |
| 2009/0046229 A1 | 2/2009 | Umemoto et al. | |
| 2009/0148682 A1 | 6/2009 | Higuchi | |
| 2009/0152391 A1 | 6/2009 | McWhirk | |
| 2009/0153783 A1 | 6/2009 | Umemoto | |
| 2009/0164067 A1 | 6/2009 | Whitehead et al. | |
| 2009/0207048 A1 | 8/2009 | He et al. | |
| 2009/0279030 A1 | 11/2009 | Toyama et al. | |
| 2009/0279175 A1 | 11/2009 | Laney et al. | |
| 2010/0033499 A1 | 2/2010 | Gannon et al. | |
| 2010/0103353 A1 | 4/2010 | Yamada | |
| 2010/0297406 A1 | 11/2010 | Schaffer et al. | |
| 2010/0312428 A1 | 12/2010 | Roberge et al. | |
| 2010/0312461 A1 | 12/2010 | Haynie et al. | |
| 2011/0037616 A1 | 2/2011 | Leutelt et al. | |
| 2011/0054729 A1 | 3/2011 | Whitehead et al. | |
| 2011/0075070 A1 | 3/2011 | Kitagawa et al. | |
| 2011/0141405 A1 | 6/2011 | Kitagawa et al. | |
| 2011/0165361 A1 | 7/2011 | Sherman et al. | |
| 2011/0184594 A1 | 7/2011 | Manfred et al. | |
| 2011/0273325 A1* | 11/2011 | Goldman | G01S 3/46 342/146 |
| 2011/0282580 A1 | 11/2011 | Mohan | |
| 2011/0304479 A1 | 12/2011 | Chen et al. | |
| 2012/0053831 A1 | 3/2012 | Halder | |
| 2012/0150426 A1 | 6/2012 | Conway | |
| 2012/0174445 A1 | 7/2012 | Jones et al. | |
| 2012/0215410 A1 | 8/2012 | McClure et al. | |
| 2013/0041529 A1 | 2/2013 | He et al. | |
| 2013/0234884 A1* | 9/2013 | Bunch | G01W 1/00 342/26 B |
| 2014/0009324 A1* | 1/2014 | Ranney | G01S 13/534 342/161 |
| 2015/0211883 A1 | 7/2015 | He | |
| 2016/0131739 A1 | 5/2016 | Jinkins et al. | |

FOREIGN PATENT DOCUMENTS

| | | |
|---|---|---|
| EP | 0 556 351 B1 | 6/1995 |
| EP | 0 962 752 A1 | 12/1999 |
| GB | 0 814 744 A | 6/1959 |
| GB | 1 092 821 A | 11/1967 |
| JP | 01-210328 | 8/1989 |
| JP | 05-200880 | 8/1993 |
| JP | 05-293895 | 11/1993 |
| JP | 06-051484 | 2/1994 |
| JP | H08-220547 A | 8/1996 |
| JP | 09-057779 | 3/1997 |
| JP | 10-156853 | 6/1998 |
| JP | 10-244589 | 9/1998 |
| JP | 2000-141388 | 5/2000 |
| JP | 2004-233590 | 8/2004 |
| JP | 2004-354645 | 12/2004 |
| JP | 2006-218658 | 8/2006 |
| JP | 2006-334912 | 12/2006 |
| JP | 2006-348208 | 12/2006 |
| JP | 2007-206559 | 8/2007 |
| JP | 2007-302398 A | 11/2007 |
| JP | 2008-238607 | 1/2008 |
| WO | WO-93/05634 | 3/1993 |
| WO | WO-2009/133102 A1 | 11/2009 |
| WO | WO-2011/089474 A2 | 7/2011 |

OTHER PUBLICATIONS

U.S. Appl. No. 11/863,219, filed Sep. 27, 2007, Woodell.
U.S. Appl. No. 11/863,221, filed Sep. 27, 2007, Woodell.
U.S. Appl. No. 11/899,801, filed Sep. 6, 2007, Woodell et al.
U.S. Appl. No. 11/900,002, filed Sep. 6, 2007, Woodell et al.
U.S. Appl. No. 12/167,200, filed Jul. 2, 2008, Woodell et al.
U.S. Appl. No. 12/167,203, filed Jul. 2, 2008, Woodell.
U.S. Appl. No. 12/167,208, filed Jul. 2, 2008, Dickerson et al.
U.S. Appl. No. 12/180,293, filed Jul. 25, 2008, Woodell et al.
U.S. Appl. No. 12/786,169, filed May 24, 2010, Nemeth et al.
U.S. Appl. No. 13/224,992, filed Sep. 2, 2011, Hufnagel et al.
U.S. Appl. No. 13/250,307, filed Mar. 30, 2011, Jinkins.
U.S. Appl. No. 13/250,798, filed Sep. 30, 2011, Jinkins.
"MountainScope™ on a TabletPC," PCAvionics™, printed from website www.pcavionics.com on Aug. 28, 2007, 1 page.
TAWS Class A and Class B, Terrain Awareness and Warning Systems, Universal® Avionics Systems Corporation, Sep. 2007, 6 pages.
"TAWS Terrain Awareness and Warning System," Universal® Avionics, printed from website www.uasc.com on Aug. 28, 2007, 2 pages.
Adams, Charlotte, "Synthetic Vision: Picturing the Future," Avionics magazine, Oct. 1, 2006, printed from website www.aviationtoday.com, 4 pages.
Adams, Charlotte, "Synthetic Vision: Picturing the Future," Avionics magazine, Solutions for Global Airspace Electronics, Oct. 2006, cover and pp. 22-29.
Advisory Action for U.S. Appl. No. 12/009,472, dated Feb. 25, 2013, 3 pages.
Advisory Action for U.S. Appl. No. 13/538,957, dated Jun. 14, 2013, 6 pages.
Blue Mountain Avionics' Products, printed from website www.bluemountainavionics.com on Aug. 28, 2007, 4 pages.
Carter, S. P., D. D. Blankenship, M. E. Peters, D. A. Young, J. W. Holt, and D. L. Morse (2007), Radar-based subglacial lake classification in Antarctica, Geochem. Geophys. Geosyst., 8, 003016, doi:10.1029/2006GC001408, 20 pages.
Final Office Action on U.S. Appl. No. 13/250,798 dated Sep. 4, 2014, 22 pages.
Final Office Action on U.S. Appl. No. 13/867,556 dated Jul. 3, 2014, 11 pages.
Final Office Action on U.S. Appl. No. 13/250,307 dated Jun. 11, 2014, 8 pages.
Final Office Action on U.S. Appl. No. 13/250,798 dated Aug. 7, 2015, 21 pages.

(56) References Cited

OTHER PUBLICATIONS

G2000, Garmin, printed from website https://buy.garmin.com/shop/shop.do?cID=153&pID=97668 on Jun. 28, 2011, 2 pages.
G3000, Garmin, printed from website https://buy.garmin.com/shop/shop.do?cID=153&pID=66916 on Jun. 28, 2011, 2 pages.
G5000, Garmin, printed from website https://buy.garmin.com/shop/shop.do?cID=153&pID=90821&ra=true on Apr. 20, 2011, 2 pages.
Non-Final Office Action on U.S. Appl. No. 13/250,798 dated Mar. 18, 2015, 21 pages.
Non-Final Office Action on U.S. Appl. No. 14/301,199 dated Sep. 9, 2015, 18 pages.
Notice of Allowance for U.S. Appl. No. 12/009,372, dated Oct. 13, 2011, 8 pages.
Notice of Allowance for U.S. Appl. No. 12/009,373, dated Jun. 16, 2010, 4 pages.
Notice of Allowance for U.S. Appl. No. 12/009,472, dated Sep. 5, 2013, 8 pages.
Notice of Allowance for U.S. Appl. No. 12/786,169, dated Mar. 28, 2013, 6 pages.
Notice of Allowance for U.S. Appl. No. 13/538,957, dated Oct. 3, 2013, 13 pages.
Office Action for U.S. Appl. No. 12/009,372, dated Dec. 20, 2010, 10 pages.
Office Action for U.S. Appl. No. 12/009,372, dated Jun. 13, 2011, 9 pages.
Office Action for U.S. Appl. No. 12/009,373, dated Dec. 30, 2009, 14 pages.
Office Action for U.S. Appl. No. 12/009,472, dated Apr. 16, 2012, 16 pages.
Office Action for U.S. Appl. No. 12/009,472, dated Jan. 14, 2011, 14 pages.
Office Action for U.S. Appl. No. 12/009,472, dated Mar. 20, 2013, 15 pages.
Office Action for U.S. Appl. No. 12/009,472, dated Nov. 3, 2011, 15 pages.
Office Action for U.S. Appl. No. 12/009,472, dated Nov. 9, 2012, 15 pages.
Office Action for U.S. Appl. No. 12/263,282, dated Jan. 5, 2012, 10 pages.
Office Action for U.S. Appl. No. 12/786,169, dated Jan. 18, 2013, 14 pages.
Office Action for U.S. Appl. No. 12/892,563, dated Feb. 19, 2013, 12 pages.
Office Action for U.S. Appl. No. 13/224,992, dated Feb. 28, 2013, 10 pages.
Office Action for U.S. Appl. No. 13/250,307, dated Nov. 5, 2013, 11 pages.
Office Action for U.S. Appl. No. 13/538,957, dated Apr. 4, 2013, 19 pages.
Office Action for U.S. Appl. No. 13/538,957, dated Oct. 5, 2012, 18 pages.
Office Action for U.S. Appl. No. 13/743,182, dated Apr. 8, 2013, 10 pages.
Office Action for U.S. Appl. No. 12/786,169, dated Jul. 20, 2012, 8 pages.
Office Action in Japanese Patent Application 2015-116688, dated Aug. 25, 2015, 4 pages.
Office Action in Japanese Patent Application 2015-116716, dated Aug. 25, 2015, 3 pages.
Office Action on U.S. Appl. No. 12/236,464, dated Feb. 11, 2014, 21 pages.
Office Action on U.S. Appl. No. 12/236,464, dated Jun. 22, 2011, 14 pages.
Office Action on U.S. Appl. No. 13/250,798 dated Apr. 23, 2014, 15 pages.
Office Action on U.S. Appl. No. 13/867,556 dated Feb. 7, 2014, 11 pages.
Office Action U.S. Appl. No. 11/787,460, dated Aug. 31, 2010, 18 pages.
Office Action with English Translation received in Korean Patent Application 10-2010-7017278, dated Aug. 26, 2015, 5 pages.
Pictures of DELPHINS, printed from website www.tunnel-in-the-sky.tudelft.nl on Aug. 28, 2007, 4 pages.
Restriction Requirement for U.S. Appl. No. 13/867,556, dated Dec. 26, 2013, 6 pages.
Van Kasteren, Joost, "Tunnel-in-the-Sky, Synthetic vision simplifies the pilot's job and enhances safety," printed from website www.delftoutlook.tudelft.nl on Aug. 28, 2007, 13 pages.
Walker, GD-Itronix Dynavue Technology, The Ultimate Outdoor-Readable Touch-Screen Display, Rugged PC Review, 4 pages.
U.S. Appl. No. 12/236,464, filed Sep. 23, 2008, Rockwell Collins.
U.S. Appl. No. 13/627,788, filed Sep. 26, 2012, Rockwell Collins.
U.S. Appl. No. 13/857,955, filed Apr. 5, 2013 Barber et al.
U.S. Appl. No. 13/250,798, filed Sep. 30, 2011, Rockwell Collins.
U.S. Appl. No. 14/301,199, filed Jun. 10, 2014, Rockwell Collins.
U.S. Appl. No. 14/482,681, filed Sep. 10, 2014, Rockwell Collins.
Airports Authority of India, Chapter 7: Visual AIDS for Navigation—Lights, available prior to Jan. 1, 2005, retrieved from the internet at: http://www.aai.aero/aai_employees/chapter_7.pdf on Sep. 26, 2014, 33 pages.
Brailovsky et al., REVS122: A Radar-Based Enhanced Vision System for Degraded Visual Environments, Proc. of SPIE vol. 9087 908708-1, retrieved from the internet at http://proceedings.spiedigitallibrary.org on Jun. 25, 2014, 13 pages.
Federal Aviation Administration, Advisory Circular AC 90-106, "Enhanced Flight Vision Systems", initiated by AFS-400, dated Jun. 2, 2010, 55 pages.
Federal Aviation Administration, Aeronautical Information Manual (AIM) Basic Flight Information and ATC Procedures, dated Jul. 24, 2014, 2 pages.
Fountain, J.R., Digital Terrain Systems, Airborne Navigation Systems Workshop (Digest No. 1997/169), IEE Colloquium, pp. 4/1-4/6, Feb. 21, 1997.
Honeywell, RDR-4B Forward looking windshear detection / weather radar system user's manual with radar operating guidelines, Rev. 6, Jul. 2003, 106 pages.
Johnson, A., et al., Vision Guided Landing of an Autonomous Helicopter in Hazardous Terrain, Robotics and Automation, 2005. ICRA 2005. Proceedings of the 2005 IEEE International Conference, pp. 3966-3971, Apr. 18-22, 2005.
Kuntman, D., Airborne system to address leading cause of injuries in non-fatal airline accidents, ICAO Journal, Mar. 2000, 4 pages.
Notice of Allowance for U.S. Appl. No. 11/863,221, dated Aug. 2, 2010, 9 pages.
Notice of Allowance for U.S. Appl. No. 11/899,801, dated Aug. 19, 2010, 5 pages.
Notice of Allowance for U.S. Appl. No. 11/900,002, dated Sep. 14, 2010, 5 pages.
Notice of Allowance for U.S. Appl. No. 12/167,200, dated Oct. 28, 2010, 5 pages.
Notice of Allowance for U.S. Appl. No. 12/167,203, dated Jun. 21, 2013, 7 pages.
Notice of Allowance for U.S. Appl. No. 12/167,208, dated Mar. 21, 2011, 8 pages.
Notice of Allowance for U.S. Appl. No. 12/180,293, dated Aug. 4, 2011, 8 pages.
Notice of Allowance on U.S. Appl. No. 13/241,051 dated Aug. 28, 2014, 9 pages.
Notice of Allowance on U.S. Appl. No. 13/247,742 dated Jul. 30, 2014, 9 pages.
Office Action for U.S. Appl. No. 11/851,323, dated Aug. 6, 2009, 23 pages.
Office Action for U.S. Appl. No. 11/851,323, dated Dec. 15, 2010, 13 pages.
Office Action for U.S. Appl. No. 11/851,323, dated Jul. 5, 2012, 23 pages.
Office Action for U.S. Appl. No. 12/167,200, dated Jul. 21, 2010, 6 pages.
Office Action for U.S. Appl. No. 12/167,203, dated Aug. 26, 2010, 11 pages.
Office Action for U.S. Appl. No. 12/167,203, dated Sep. 21, 2012, 6 pages.

(56) References Cited

OTHER PUBLICATIONS

Office Action for U.S. Appl. No. 12/167,208, dated Dec. 30, 2009, 10 pages.
Office Action for U.S. Appl. No. 12/167,208, dated Jun. 3, 2010, 11 pages.
Office Action for U.S. Appl. No. 12/167,208, dated Oct. 19, 2010, 8 pages.
Office Action for U.S. Appl. No. 12/180,293, dated Jan. 4, 2011, 5 pages.
Office Action for U.S. Appl. No. 12/180,293, dated Jul. 28, 2010, 8 pages.
Office Action for U.S. Appl. No. 12/976,871, dated Feb. 15, 2012, 8 pages.
Office Action for U.S. Appl. No. 12/976,871, dated Jul. 10, 2012, 4 pages.
Office Action for U.S. Appl. No. 12/976,871, dated May 6, 2013, 5 pages.
Office Action for U.S. Appl. No. 12/976,871, dated Nov. 21, 2012, 5 pages.
Office Action for U.S. Appl. No. 12/976,871, dated Oct. 9, 2013, 5 pages.
Office Action for U.S. Appl. No. 13/183,314, dated Aug. 14, 2013, 11 pages.
Office Action for U.S. Appl. No. 13/183,314, dated Mar. 28, 2013, 12 pages.
Office Action for U.S. Appl. No. 13/474,559, dated Aug. 28, 2013, 10 pages.
Office Action for U.S. Appl. No. 13/474,559, dated Dec. 28, 2012, 8 pages.
Office Action on U.S. Appl. No. 13/241,051 dated Feb. 27, 2014, 21 pages.
Office Action on U.S. Appl. No. 13/247,742 dated Dec. 3, 2013, 11 pages.
REVS Product Information Sheet, Sierra Nevada Corporation, dated May 7, 2014, 2 pages.
Skolnik, Introduction to Radar Systems, McGraw Hill Book Company, 2001, 3 pages.
Skolnik, Radar Handbook (McGraw Hill Book Company), 1990, 23 pages.
Synthetic Vision System, en.wikipedia.org/wiki/Synthetic_vision_system, retrieved Feb. 28, 2013, 4 pages.
Technical Standard Order, TSO-C115b, Airborne Area Navigation Equipment Using Multi-Sensor Inputs, Department of Transportation, Federal Aviation Administration, Sep. 30, 1994, 11 pages.
U.S. Office Action on U.S. Appl. No. 11/900,002 dated Jun. 8, 2010.
U.S. Office Action on U.S. Appl. No. 13/247,742 dated Apr. 16, 2014, 15 pages.
Vadlamani, A., et al., Improving the detection capability of spatial failure modes using downward-looking sensors in terrain database integrity monitors, Digital Avionics Systems Conference, 2003. DASC-03. The 22nd, vol. 2, pp. 9C.5-91-12 vol. 2, Oct. 12-16, 2003.
Wang et al., A Simple Based on DSP Antenna Controller of Weather Radar, 2001 CIE International Conference, 4 pages.
Non-Final Office Action on U.S. Appl. No. 13/250,798 dated Feb. 26, 2016, 9 pages.
Notice of Allowance on U.S. Appl. No. 12/263,282 dated Jan. 29, 2016, 8 pages.
Notice of Allowance on U.S. Appl. No. 14/301,199 dated Mar. 1, 2016, 11 pages.
First Office Action on Korean Patent Application No. 10-2016-7013740, dated Sep. 19, 2016, 7 pages.
U.S. Appl. No. 14/841,558, filed Aug. 31, 2015, Rockwell Collins, Inc.
McGray et al., Air Operators, Airlines, Manufacturers and Interested Industry Stakeholders & Aero Chart Forum-Utilizing EFVS technology and incorporating it into FAA NextGen, Federal Aviation Administration, Apr. 23, 2014 & Apr. 30, 2014, 34 pages.
Non-Final Office Action on U.S. Appl. No. 13/250,798, dated Sep. 9, 2016, 6 pages.
Notice of Allowance on U.S. Appl. No. 13/250,798, dated Sep. 28, 2016, 10 pages.
Non-Final Office Action on U.S. Appl. No. 14/482,681, dated Dec. 20, 2016, 9 pages.
English Translation of Japanese Notice of Reasons for Rejection in Japanese Application No. 2016-001165 , dated Apr. 25, 2017, 1 page.
Non-Final Office Action on U.S. Appl. No. 14/270,587, dated May 8, 2017, 16 pages.
First Office Action with English Translation of Chinese Application No. 201510005057.5, dated Apr. 25, 2017, 8 pages.

* cited by examiner

DISPLAY SYSTEM AND METHOD USING WEATHER RADAR SENSING

CROSS-REFERENCE TO RELATED PATENT APPLICATIONS

The present application is related to U.S. patent application Ser. No. 14/482,681 filed Sep. 10, 2014 by Wood et al., U.S. patent application Ser. No. 14/301,199 filed on Jun. 10, 2014 by McCusker et al, U.S. patent application Ser. No. 13/627,788 filed on Sep. 26, 2012; U.S. patent application Ser. No. 12/892,563 filed on Sep. 28, 2010, U.S. patent application Ser. No. 13/250,798 filed on Sep. 30, 2011, U.S. patent application Ser. No. 12/236,464 filed on Sep. 28, 2008, U.S. patent application Ser. No. 12/167,200 filed on Jul. 2, 2008, U.S. patent application Ser. No. 12/180,293 filed on Jul. 25, 2008, U.S. patent application Ser. No. 13/247,742 filed on Sep. 28, 2011, U.S. patent application Ser. No. 11/851,323 filed on Sep. 6, 2007, U.S. patent application Ser. No. 11/904,491 filed on Sep. 26, 2007, U.S. patent application Ser. No. 13/241,051 filed on Sep. 22, 2011, U.S. patent application Ser. No. 12/263,282 filed on Oct. 31, 2008 and U.S. patent application Ser. No. 12/180,293 filed on Jul. 25, 2008, all of which are herein incorporated by reference in their entireties and assigned to the assignee of the present application.

BACKGROUND

An aircraft uses an enhanced vision system (EVS) to provide imagery to an aircraft crew. The imagery can include an airport terminal area and runway environment when meteorological conditions prevent a clear natural view of the external surroundings of the aircraft through the windscreen. For example, the EVS may overlay an image of an airport terminal area and runway environment over the pilot's natural unaided view of the external surroundings of the aircraft through the aircraft's cockpit windscreen. Such imagery can improve the situational awareness of the flight crew during instrument approach procedures in low visibility conditions such as fog. That same enhanced vision system can be used as an FAA-certified enhanced flight vision systems (EFVS) which can allow pilots landing under instrument flight rules to operate below certain specified altitudes during instrument approaches even when the airport environment is not visible. For example, under Title 14 of the Code of Federal Regulations, part 91, a pilot may not descend below decision altitude (DA) or minimum descent altitude (MDA) to 100 feet above the touchdown zone elevation (TDZE) from a straight-in instrument approach procedure (IAP), other than Category II or Category III, unless the pilot can see certain required visual references. Such visual references include, for example, the approach lighting system, the threshold lighting system, and the runway edge lighting system. The pilot may, however, use an EFVS to identify the required visual references in low visibility conditions where the pilot's natural unaided vision is unable to identify these visual references. Accordingly, the use of an EFVS may minimize losses due to the inability of the pilot to land the plane and deliver cargo and/or passengers on time in low visibility conditions.

EVS imagery is typically presented to the pilot flying (PF) on a head up display (HUD). The HUD is typically a transparent display device that allows the PF to view EVS imagery while looking at the external surroundings of the aircraft through the cockpit windscreen. As long as visibility conditions outside of the aircraft permit the PF to see the external surroundings of the aircraft through the cockpit windscreen, the PF can verify that the EVS is functioning properly such that the imagery on the HUD is in alignment with the PF's view of the external surroundings of the aircraft.

EVS imagery is sometimes also presented to the pilot monitoring (PM) on a head down display (HDD). For example, in some countries, the system must present the EVS imagery to the PM for confirmation that the EVS information is a reliable and accurate indicator of the required visual references. The PM may also use the EVS imagery to determine whether the PF is taking appropriate action during approach and landing procedures. The HDD is typically a non-transparent display device mounted adjacent to or within a console or instrument panel of the aircraft.

An EVS typically uses either a passive or active sensing system to acquire data used to generate imagery of the airport terminal area and runway environment. A typical passive sensor, such as a forward looking infrared (FLIR) camera or visible light spectrum camera, receives electromagnetic energy from the environment and outputs data that may be used by the system to generate video images from the point of view of the camera. The camera is installed in an appropriate position, such as in the nose of an aircraft, so that the PF may be presented with an appropriately scaled and positioned video image on the HUD having nearly the same point of view as the PF when viewing the external surroundings of the aircraft through the HUD. However, while passive sensors provide higher quality video imagery, they may be unable to identify required visual references in certain low visibility conditions such as heavy fog.

Active sensing systems, such as millimeter wavelength (MMW) radar systems (e.g., 94 GHz), transmit electromagnetic energy into the environment and then receive return electromagnetic energy reflected from the environment. The active sensing system is typically installed in an appropriate position, such as in the nose of an aircraft. Active sensing systems are expensive and require space on-board the aircraft that is required for other types of equipment. In addition, MMW radar systems require expensive radome technology.

Additionally, both passive FLIR cameras and active millimeter wavelength radar systems may have limited range in certain low visibility conditions such as heavy fog.

Thus, there is a need for real time or near real time sensing systems for and methods of providing enhanced vision at longer ranges and in inclement weather. Further, there is a need for real time or near real time sensing systems for and methods of providing enhanced vision imagery that is less expensive and does not require additional space on the aircraft. There is also a need for display systems for and methods of providing images of the external scene topography using radar data from a weather radar system. There is still a further need for systems for and methods of providing images of the runway environment derived from weather radar data where such images enable operation below certain specified altitudes during instrument approaches. Further still, there is a need for systems and methods that achieve higher resolution imaging using X-band and C-band radar data.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

In one aspect, embodiments of the inventive concepts disclosed herein are directed to an image processing system for enhanced vision including a processor and memory coupled to the processor. The memory contains program instructions that, when executed, causes the processor to provide radar beams and receive radar returns with improved angular and/or range resolution for deriving image data of the external scene topography.

In a further aspect, embodiments of the inventive concepts disclosed herein are directed to a vision method which uses or a vision system which includes a weather radar system configured to enhance resolution in range and in azimuth. The weather radar system generates image data associated with radar returns received by the weather radar system. The radar returns are in an X-band or a C-band. The vision system also includes a display in communication with the weather radar system configured to display an image associated with the image data.

In a further aspect, embodiments of the inventive concepts disclosed herein are directed to an airborne weather radar system which provides enhanced vision. The weather radar system includes an antenna, and a control circuit configured to provide radar beams via the antenna toward external surroundings and configured to receive radar returns. The control circuit is configured to process the radar returns to provide image data associated with the external surroundings. The weather radar system provides increased range resolution and increased angular resolution compared to weather radar sensing functions for the radar returns used to provide the image data. The radar beams are in the X-band or the C-band, and the image data is for providing a visual image of the external scene topography to a pilot.

In a further aspect, embodiments of the inventive concepts disclosed herein are directed to a method that provides a real time sensor image. The method includes receiving radar returns from an X-band or C-band airborne weather radar system. The radar returns can be processed to have increased range resolution and angular resolution and are received from external surroundings. The method also includes providing a visual image of the external scene topography based on the radar returns.

BRIEF DESCRIPTION OF THE DRAWINGS

Implementations of the inventive concepts disclosed herein may be better understood when consideration is given to the following detailed description thereof. Such description makes reference to the annexed drawings, which are not necessarily to scale, and in which some features may be exaggerated and some features may be omitted or may be represented schematically in the interest of clarity. Like reference numerals in the figures may represent and refer to the same or similar element, feature, or function. In the drawings.

DETAILED DESCRIPTION

Figure 1:
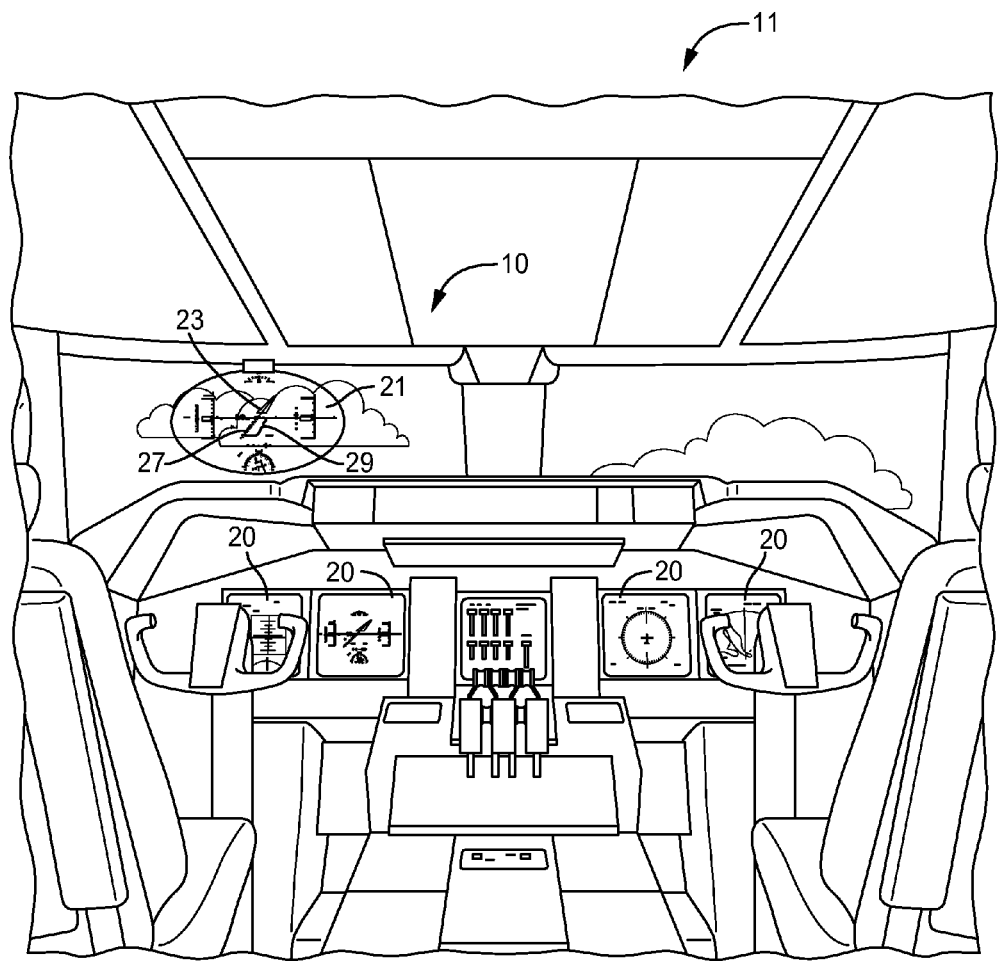
FIG. 1 is a schematic illustration of an aircraft control center or cockpit, according to an exemplary embodiment of the inventive concepts disclosed herein.

Before describing in detail the inventive concepts disclosed herein, it should be observed that the inventive concepts disclosed herein include, but are not limited to, a novel structural combination of data/signal processing components and communications circuits, and not in the particular detailed configurations thereof. Accordingly, the structure, methods, functions, control and arrangement of components, software, and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the exemplary diagrams, but should be construed in accordance with the language in the claims.

According to various exemplary embodiments, an EVS or display system may be provided with radar sensing and imagery displayable to a pilot or co-pilot on an aircraft display, such as an HDD or HUD. For example, the display system may include or use a weather radar system to display an image based upon radar return data. In some embodiments, a Doppler weather radar system may be configured to have enhanced resolution (e.g., angular resolution and/or range resolution). Reflectivity of radar returns from runway structures in an airport terminal or runway environment, such as, an approach lighting system, a threshold lighting system, and or a runway edge lighting system, can be sensed. As will be appreciated, using a weather radar system configured according to the various exemplary embodiments provides greater range than millimeter wavelength radar sensing systems or passive FLIR or visible light camera systems in low visibility conditions, such as, heavy fog, given the weather radar system's superior ability of weather radar system to penetrate heavy fog.

Using the weather radar system configured according to the various exemplary embodiments may also provide EVS imagery having sufficient accuracy in low visibility conditions (given that many of the visual references required under Title 14 of the Code of Federal Regulations, part 91, such as, approach lighting systems, threshold lighting systems, runway edge lighting systems, and other runway structures, are metallic structures that exhibit high radar reflectivity). The imagery may allow lower landing minima (e.g., 100 feet or less) in some embodiments. In some embodiments, the lack of radar returns from the runway surface combined with runway structures and lights can provide a suitable image for runway identification by the pilot.

The display system includes a radar processing module in communication with the radar system and configured to generate high resolution radar image data for display in some embodiments. The image data is processed to provide a two-dimensional aircraft situation display (e.g., vertical profile display or plan view display) or three dimensional or perspective aircraft situation display image representative of the 3-D positions of runway structures in an airport terminal or runway environment based on the radar returns as described in U.S. patent application Ser. Nos. 14/301,199 and 14/482,681 incorporated herein by reference in their entireties in some embodiments. For example, the radar processing module can be embodied as a processor and a non-transitory memory containing program instructions that, when executed, cause the processor to provide radar beams and receive radar returns and generate image data from the radar returns. In some embodiments, program instructions stored on the non-transitory medium can cause the processor to filter the radar returns data to remove noise.

According to certain exemplary embodiments, a radar system such as a weather radar system, can be used to detect features of a runway environment. Utilizing the high radar cross section associated with metal content of runway lighting advantageously allows detection to be achieved whether at day or night, regardless of whether runway lights are on or are off in some embodiments. In one embodiment, the regular, periodic, equal spacing nature of visual aids, such as, approach lighting system, runway edge lights, taxi way lights, and center line lights, can be identified from the image generated from the radar data. In certain embodiments, the systems and methods can be utilized as extension to a combined vision system (CVS).

Referring to FIG. 1, a display system 10 is provided in an aircraft having an aircraft control center 11 or cockpit. The aircraft control center 11 includes flight displays 20 embodied as head down displays (HDDs). The aircraft control center 11 can also include a combiner 21 association with a head up display (HUD) system. In some embodiments, the combiner 21 is provided as part of a wearable HUD. Conformal images are provided on the combiner 21 in some embodiments.

The flight displays 20 and the combiner 21 can be used to provide information to the flight crew, thereby increasing visual range and enhancing decision-making abilities. In an exemplary embodiment, the flight displays 20 and the combiner 21 can include a weather display, a joint display, a weather radar map and a terrain display. Further, the flight displays 20 may include images from a synthetic vision system (SVS) or an enhanced vision system (EVS) (e.g., an EFVS). For example, the flight displays 20 can include a display configured to display a perspective image of terrain and/or weather information. Other views of terrain and/or weather information may also be provided (e.g., plan view, horizontal view, vertical view, or combinations thereof). Additionally, the flight displays 20 can be implemented using any of a variety of display technologies, including CRT, LCD, organic LED, dot matrix display, and others.

According to some embodiments, the display system 10 is configured to provide an image based upon radar data to at least one of the displays 20 or the combiner 21. In FIG. 1, the image on the combiner 21 includes a runway 23 or features 29 associated with the runway 23 as viewed from the aircraft (e.g., during approach and/or landing). In some embodiments, at least one of the displays 20 or the combiner 21 displays a merged image of terrain derived from two or more of enhanced vision data, radar data, and SVS data. Advantageously, real time radar data can be provided to provide a real time, all weather detection of the runway features 29 associated with the runway 23 in one embodiment. Advantageously, the radar data allows the runway 23 and its orientation to be viewed by one or more pilots in challenging weather conditions in some embodiments.

In some embodiments, a symbol or icon for the runway 23 and extended centerline 27 can be provided on the displays 20 or the combiner 21. In some embodiments, the runway 23 and extended centerline 27 can be associated with SVS data. A set of runway features 29, such as, approach lighting system or other runway and taxi way lights, can be indicated on the displays 20 or the combiner 21 in some embodiments. The runway features 29 can be associated with radar data in some embodiments.

Figure 2:
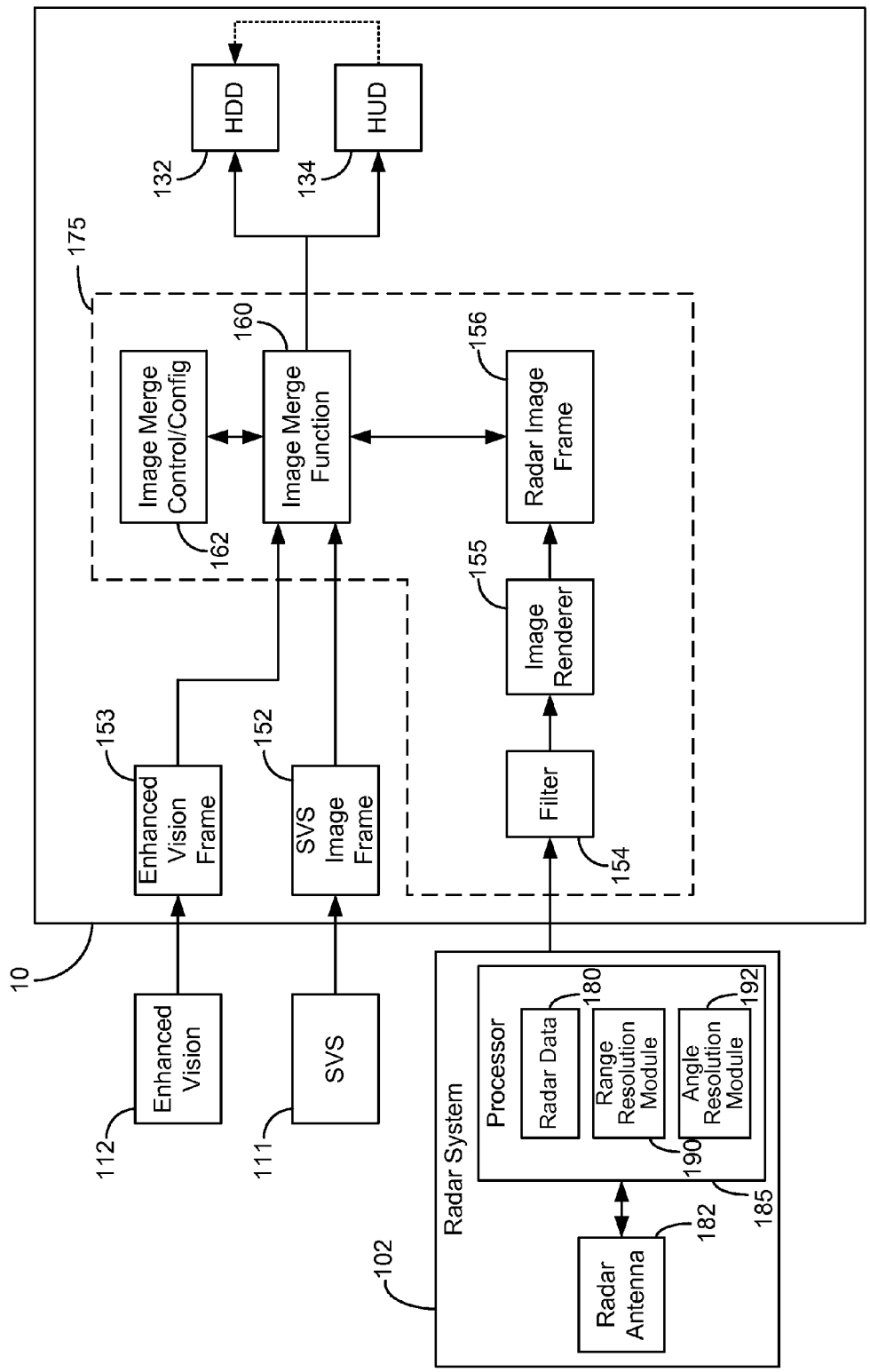
FIG. 2 is a schematic general block diagram of a display system for displaying an image derived from radar data, according to an exemplary embodiment of the inventive concepts disclosed herein.

Referring to FIG. 2, the display system 10 can be utilized for providing an image to any of the displays 20 or the combiner 21. The display system 10 is in communication with or includes a radar system 102, a synthetic vision system (SVS) 111 and an enhanced vision system (EVS) 112. The EVS 112 and the SVS 111 are optional in some embodiments. The display system 10 can include an HDD computer 132 and a HUD computer 134. The display system 10 includes a memory 153 for storing enhanced vision frame from the EVS 112, a memory 152 for storing enhanced vision frame from the SVS 111, a filter 154, an image renderer 155, a memory 156 for storing the radar image from the image renderer 155, an image merge function module 160, and an image merge control/configuration module 162.

The filter 154, the image renderer 155, the image merge module 160, and the image merge control/configuration module 162 can be embodied as software modules operating on a computing platform or a processor 175 and can be stored on a non-transitory medium. The processor 175 can be part of or integrated with the radar system 102, the SVS 111, the EVS 112, HDD display computer 132, or HUD computer 134 in certain embodiments. In one embodiment, processor 175 is an independent platform.

The radar system 102 is a weather radar system generally located inside the nose of the aircraft, inside a cockpit of the aircraft, on the top of the aircraft or on the tail of the aircraft in some embodiments. The radar system 102 can include a radar data storage unit 180, a radar antenna 182 and a processor 185. The radar system 102 can be a weather radar system, such as, a Multiscan™ radar system from Rockwell Collins, Inc. configured as described herein. The radar system 102 can utilize a split, half or sub-aperture or other technique for obtaining radar data associated with external surroundings in some embodiments. The radar system 102 can use the split or sub-aperture techniques of the radar systems described in U.S. application Ser. Nos. 13/627,788, 12/892,563, 13/250,798, 12/236,464, and 12/167,200 and U.S. Pat. No. 8,077,078, incorporated herein by reference and assigned to the assignee of the present application. The type of the radar system 102 and data gathering techniques are not discussed in the specification in a limiting fashion.

The processor 185 receives radar returns (e.g., weather radar returns data) from the radar antenna 182, processes the radar returns and provides the radar data in radar data storage unit 180. In certain embodiments, the data stored in radar data storage unit 180 can be stored as an image frame representing the data from a radar scan of the external surroundings (e.g., a runway environment).

The radar system 102 provides radar data (e.g., weather radar data) in the storage unit 180 to a filter 154 in one embodiment. In one embodiment, the image renderer 155 or other image generator can generate an image frame from the data stored in radar data storage unit 180 or filtered by the filter 154 and provides this to memory 156. Alternatively, the processor 185 can build the frame or image based upon radar return data from the radar system 102. Similarly, the SVS 111 can provide data or a frame for SVS image received by a memory 152. Alternatively, the display system 10 can provide the data or image frame to the memory 152 in response to data from the SVS 111. Similarly, the EVS 112 can provide data or a frame for EVS image received by a memory 153. Alternatively, the display system 10 can provide the data or image frame to the memory 153 in response to data from the EVS 112.

The radar data associated with the external surroundings can represent detected targets and the location of the detected targets. Targets include terrain, man-made features, objects, runways, etc. Improved angular resolution and range resolution techniques allow the location of the targets to be more accurately determined and represented in image data in some embodiments. The radar system 102 scans the external surroundings in front of the aircraft to sense the location of targets. The radar system 102 can utilize clutter suppression and Doppler filtering to improve performance in some embodiments.

In some embodiments, the radar system 102 provides data representing a 120 degree field of view in accordance with a weather radar sweep which takes approximately five seconds to complete in one embodiment. The sweep can be limited during approach to be a 30 degree sweep which requires five seconds before new data is available for display in certain embodiments. The sweep is directed toward the surface of the Earth so that returns are obtained which allow runway environment features to be detected. Various types of sweeps, scans and timings of sweeps and scans can be utilized without departing from the scope of the invention.

The radar system 102 embodied as a weather radar allows existing avionic equipment to be used as a real-time sensor for providing a radar-derived enhanced image of the external scene topography to the pilot in some embodiments. The image or representation generated by the radar system 102 is provided on the displays 20 or the combiner 21 can function as an EVS to provide situation awareness to the pilot in some embodiments. In other embodiments, the image or representation generated by the radar system 102 is provided on the displays 20 or the combiner 21 can function as an EFVS to allow lower landing minima.

The radar system 102 includes a range resolution module 190 and an angle resolution module 192 in some embodiments. The range resolution module 190 advantageously increases the range resolution of the radar system 102 when compared to conventional weather sensing operations in some embodiments. The angle resolution module 190 advantageously increases the angle resolution of the radar system 102 when compared to conventional weather sensing operations in some embodiments. The increased resolution in range and angle allows a higher resolution image to be provided on the displays 20 and the combiner 21 in some embodiments. The range resolution module 190 and the angle resolution module 192 can be software modules executed by the processor 185.

According to some embodiments, the radar system 102 under control of the angle resolution module 192 can use a beam sharpening method to achieve increased angular resolution. In some embodiments, the radar system 102 can utilize techniques such as beam sharpening (e.g., horizontal beam sharpening) and de-convolution of the beam point spread function for improved angular resolution. In some embodiments, the radar system 102 can use beam sharpening as a process that improves the antenna-induced poor angular resolution (e.g., due to the beam width). There are many methods that can be used such as: Doppler Beam Sharpening, Synthetic Aperture Radar (SAR), Monopulse Radar, Sub-Aperture Radar or Split-Aperture Radar, etc. Mathematical methods can be utilized to determine a center of the radar echo for identifying runway features. Techniques for beam sharpening are discussed in U.S. patent application Ser. Nos. 13/627,788, 12/892,563, 13/250,798, 12/236,464, and 12/167,200 and U.S. Pat. No. 8,077,078 incorporated herein by reference in their entireties.

The radar system 102 can use the radar antenna 182 configured as a switched aperture antenna for beam sharpening. The radar system 102 can also be configured for sequential lobing or monopulse operation to accurately estimate at which angle the target was located within the radar beam. In some embodiments, the radar beams provided by the radar antenna 182 and returns received by the radar antenna 182 associated with the radar system 102 can be separated into two or more portions and can be used to determine an angle from the radar antenna 182 to a target or a vector from the radar antenna 182 to a target such as a runway feature. The vector can be represented as an angle (bore site angle) and range to the target. Various processes can be utilized to calculate the angle or vector to the target.

The radar system 102 uses the radar antenna 182 that toggles between transmitting and receiving on the full aperture and transmitting on the full aperture while receiving on the partial aperture in some embodiments. These techniques can be used to accurately estimate at which angle the target was located within the radar beam and can be used to improve the accuracy of the Doppler calculations correcting for those angles. The received returns can be processed to determine a high resolution estimate of a target angle relative to the bore site of the antenna beam. According to some embodiments, the returns can be processed using a complex conjugate multiplication method to determine the target angle. The processing can be related to sequential lobing processing but is executed in the phase domain as opposed to the common amplitude domain in some embodiments.

In some embodiments, the radar system 102 uses sequential lobing techniques where two antennas that are close to the same place may be used, going back and forth between the two antennas. An amplitude signature or phase signature that varies between the two halves of the antennas may be used to obtain data about target position for detected targets (e.g., an object such as other aircraft, terrain, towers). Sequential lobing generally does not use phase comparisons with moving targets due to Doppler-induced phase changes that contaminate the phase center measurement. However, using a complex conjugate multiply method allows the Doppler-induced phase changes to be removed by cancellation. Therefore, a change in phase center between multiple different sub-apertures may be determined and used to determine angle to target.

In some embodiments, the range resolution module 190 provides higher resolution by increasing the effective waveform bandwidth of the radar system 102. The range resolution module 190 can use stepped-frequency compression in some embodiments. To provide higher range resolution, the range resolution module 192 can control the radar system 102 to provide ultra-wideband radar (UWB) beams (e.g., extremely narrow pulses with high power), or to provide intra pulse compression (frequency of phase modulation of the transmitted pulse) in some embodiments. Frequency coding techniques including the common linear frequency modulation (LFM) or chirp method, and discrete coded segments within the pulse can be utilized in some embodiments. Phase coding techniques including binary phase codes as well as various polyphase codes can be utilized in some embodiments. To provide higher range resolution, the range resolution module 192 can control the radar system 102 to provide interpulse pulse compression or stepped frequency compression (e.g., successive pulses with discrete increasing frequency steps) in some embodiments. In some embodiments, stepped frequency compression advantageously achieves high effective bandwidth with narrow instantaneous bandwidth. The receive bandwidth is smaller, has lower noise bandwidth, and a higher signal to noise ratio in some embodiments. Analog-to-digital sampling rates are lower (vs. pulse-compression) in some embodiments. In addition, the stepped frequency compression also has a smaller peak power (e.g., when compared to impulse), provides flexible transmit frequency control, can "hop" over restricted or undesired transmit frequencies, enables adaptive/cognitive frequency use, and rejects later received clutter from earlier transmit pulses in some embodiments. Further, the stepped frequency compression provides returns from clutter in ambiguous ranges that have frequencies that are different from returns from targets and rejects ambiguous clutter returns in the receiver IF filter of the radar system 102 in some embodiments. Stepped frequency compression generally does not achieve range resolution with a single pulse, requires transmit, receive and processing of a group of pulses for any one bin, and has more pronounced range-Doppler coupling (e.g., different Doppler shifts for each frequency) in some embodiments.

According to one embodiment, the SVS 111 can be any electronic system or device for providing a computer generated image of the external scene topography. The image can be from the perspective of the aircraft flight deck as derived from aircraft attitude, high-precision navigation solutions, and a database of terrain, obstacles and runway features. Generally, only those terrain, obstacle, and runway features which are contained in the current version of the SVS database are displayed in a conventional system. In some embodiments, the pilot uses the synthetic vision images as enhancements to available visual cues.

According to one embodiment, the EVS 112 can be any electronic system or device for providing a sensed image of the external scene topography. The EVS 112 can be an infrared camera in one embodiment.

In some embodiments, the display system 10 combines or fuses images from the HUD computer 134, the SVS 111 and/or the EVS 112 with the image derived from radar data from the radar system 102 to provide an overall image provided to the pilot according to one embodiment. In some embodiment, the image derived from the radar data are fused with HUD symbology for the displays 20 or the combiner 21.

The SVS 111 can include a terrain database and a processor according to one exemplary embodiment. The terrain database can be used to create a perspective image of the scene in front of the aircraft on a two-dimensional display or a three dimensional display. The terrain database can employ topographical colors similar to those depicted on standard aeronautical charts.

The SVS 111 can also receive aircraft position data from an aircraft data source. The aircraft data source can include any system or sensor (or combination thereof) that provides navigation data or aircraft flight parameters. For example, a typical navigation system in an aircraft has numerous sub-systems. Sub-systems which provide aircraft position data and flight parameter data could include, but are not limited to, an inertial navigation system (INS), a global navigation satellite system (e.g., global positioning system (GPS)), air data sensors, compasses, and a flight management computer (FMC).

In some embodiments, the filter 154 processes the radar data for better image quality. The filter 154 can be located in the radar system 102. The filter 154 can reduce noise and employ anti-speckling filtering, Kalman filtering, Chebyshev filtering, adaptive filtering, smoothing, etc. The filter 154 can also perform anti-aliasing in some embodiments. Techniques for increasing image quality and identifying runway features are discussed in U.S. patent application Ser. No. 14/482,681 and incorporated herein by reference.

In order to facilitate generation of clearer images, the processor 185 and/or the filter 154 may be configured to filter the radar returns data to identify areas having a reflectivity lower than a predetermined value. In some embodiments, low energy areas may be zeroed out based on their corresponding reflectivity values, such that the area will be rendered transparent. Such filtering may result in a final image with only highly reflective structures in an airport terminal area or runway environment, such as an approach lighting system, a threshold lighting system, and or a runway edge lighting system.

In some embodiments, the radar data from the radar data storage unit 180 is provided to filter 154, the image renderer 155, and the provided as image data to memory 156 and to the HUD computer 134 or the HDD display computer 132 for providing images on the displays 20 or the combiner 21. In another embodiment, the radar data can be provided as image data to an image merge function module 160. The image merge function module 160 receives an EVS frame from the memory 153 or an SVS frame from the memory 152 and merges the data to appropriately display an EVS image or an SVS image with the image derived from the radar data.

The processor 175 executes a fusion processing algorithm for fusing the frames from the memory 152, the memory 153, and the memory 156 provided as video signals in some embodiments. This fusion process may include special formatting (positioning, sizing, cropping, etc.) of specific features or the entire image from a specific image source based on other sensor inputs or aircraft. After the combined or fused image has been completed, the entire image is sized to fit appropriately within the total HUD field-of-view (e.g., with HUD symbology) and conformally overlay the outside scene, which is viewed through the combiner 21 of the HUD. In addition, the overall fused image contrast is standardized with the brightness/contrast to support the brightness/contrast controls of the HUD.

The processors 175 and 185 can be any hardware and/or software processor or processing architecture capable of executing instructions and operating on navigational and radar data. The processors 175 and 185 can be capable of determining navigational information such as altitude, heading, bearing, and location based on data from aircraft sensors. Applicants note that flow 300 can be performed in various equipment on the aircraft including in the HUD computer 134, a display processor, the weather radar system 102, a navigation system, the SVS 111, etc. in accordance with an exemplary embodiment. The processors 175 and 185 may be, or may include, one or more microprocessors, an application specific integrated circuit (ASIC), a circuit containing one or more processing components, a group of distributed processing components, circuitry for supporting a microprocessor, or other hardware configured for processing.

Image merge control configuration module 162 can provide format adjustments to data. The SVS 111 and the radar system 102 can have their own specific interface type and format. Also, each display of the displays 20 and the combiner 21 may require specific formatting. A standard format can be a format used in HUD processing functions. The image control configuration module 138 can be implemented in hardware, software, or combinations thereof.

Real time images derived from radar data allow the pilot exact and very reliable confirmation of the presence of a runway in some embodiment. In one embodiment, localization of the pattern of runway environment features, such as the runway approach lights or the runway edge lights allows easy recognition of the location of the runway with respect to the aircraft. In some embodiments the image data can be processed to provide a two-dimensional aircraft situation display (e.g., vertical profile display or plan view display). In other embodiments the image data can be processed to provide a three dimensional or perspective aircraft situation display image representative of the 3-D positions of runway environment features.

Figure 3:
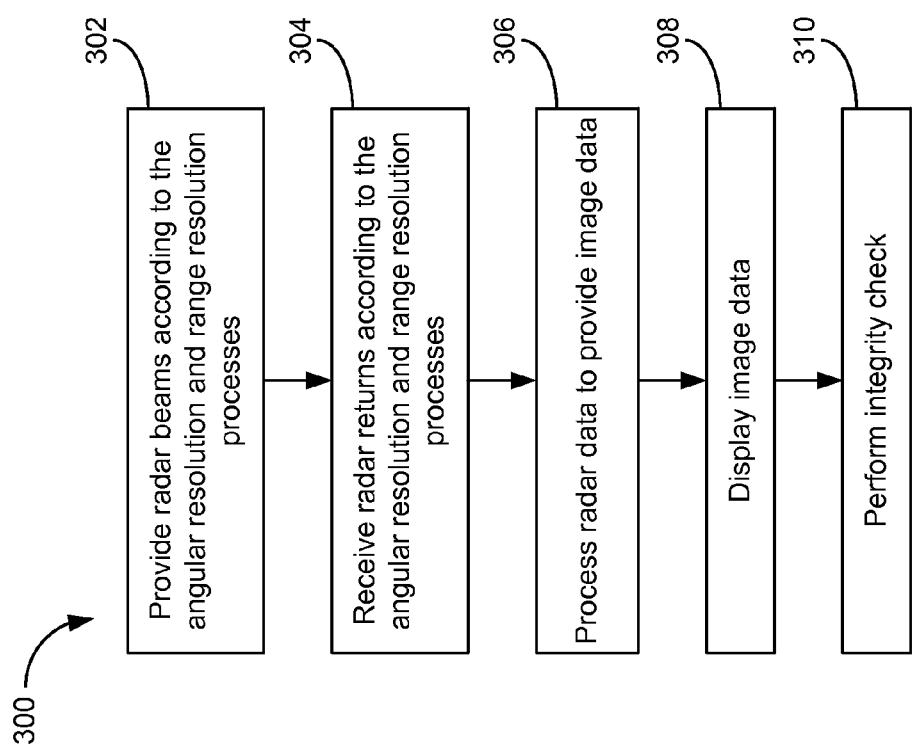
FIG. 3 is a flow diagram showing an exemplary process used by the system illustrated in FIG. 2, according to a further exemplary embodiment of the inventive concepts disclosed herein.

With reference to FIG. 3, a flow 300 can be performed by the display system 10 in some embodiments. At an operation 302, the weather radar system 102 provides a weather radar scan comprised of multiple radar beams. The radar beams are provided according to beam sharpening techniques and stepped frequency compression techniques in a way to increase the angular and range resolution in some embodiments. At an operation 304, radar returns are received according to the beam sharpening techniques and the stepped frequency compression techniques to increase the angular and range resolution in some embodiments. At an operation 306, the radar returns are processed to obtain image data in some embodiments. As discussed above, filtering or related techniques can be performed in an optional step by the filter 154. At an operation 308, the image data is merged with other image data, such as overlay symbology or sources of SVS or other EVS images. Operation 308 is optional.

At an operation 310, the image associated with the image data is displayed on a display via a display computer such as the HUD display computer 132 or the HUD computer 134. After operation 310, flow 300 returns to operation 302 in some embodiments.

Figure 4:
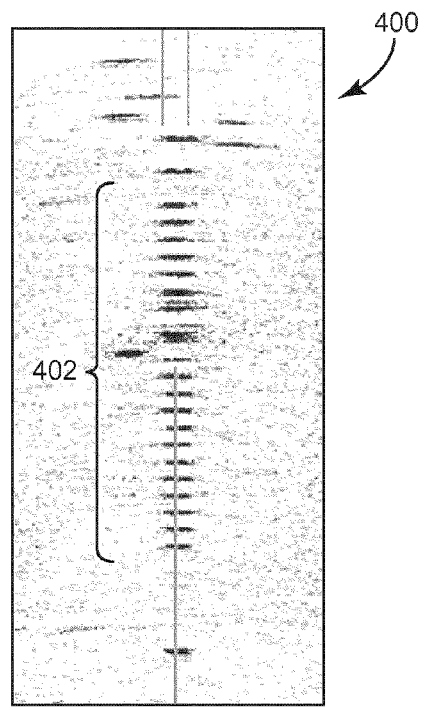
FIG. 4 is an illustration of an image derived from radar data provided by the display system illustrated in FIG. 2 according to an exemplary embodiment of the inventive concepts disclosed herein.

With reference to FIG. 4, an image 400 of the external scene topography derived from radar associated with storage unit 180 includes features 402 associated with runway approach lights.

Figure 5:
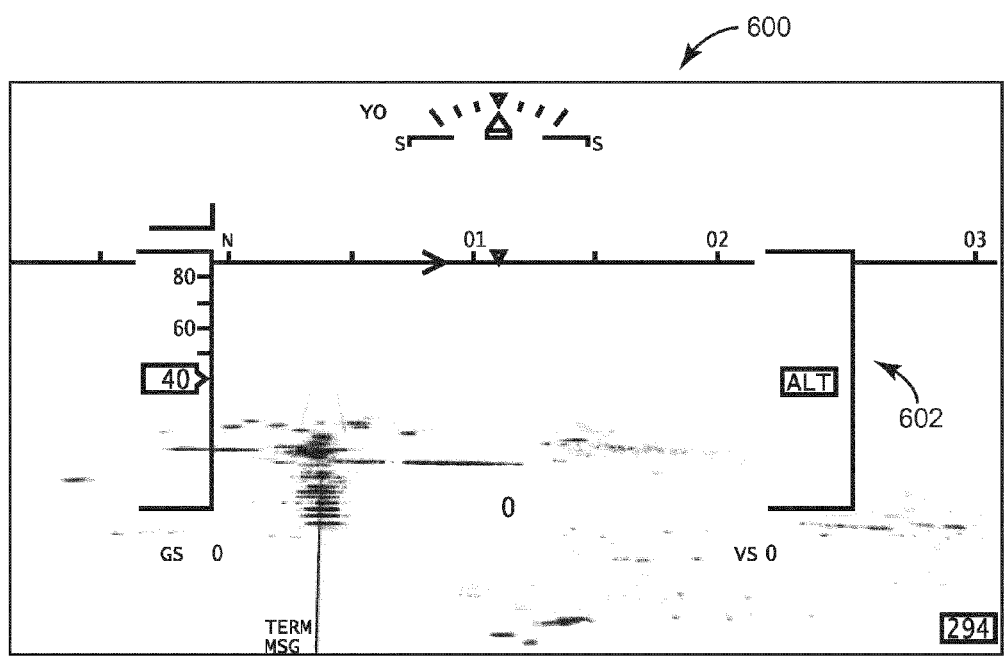
FIG. 5 is an illustration of an image derived from radar data and merged with HUD symbology provided by the display system illustrated in FIG. 2 according to yet another exemplary embodiment of the inventive concepts disclosed herein.

With reference to FIG. 5, an image 600 derived from the radar data is provided with HUD symbols 602. The HUD symbols 602 are shown in static format as a representative example only.

The radar system 102 generally operates by sweeping a radar beam horizontally and/or vertically along the sky for weather detection. For example, radar system 102 may conduct a first horizontal sweep directly in front of the aircraft and a second horizontal sweep downward at some tilt angle (e.g., 20 degrees down). Returns from different tilt angles may be electronically merged to form a composite image for display on an electronic display, such as the displays 20 and the combiner 21 in the aircraft control center 11. Sensing of the external surroundings can be performed at higher resolutions than the weather sensing and use one or more beams directed toward the external surroundings. Sensing of the external surroundings can be performed in a more forward looking direction with smaller azimuthal sweeps than are used for weather detection in some embodiments. GPS and/or other navigation information can be used to point the radar beam toward the external surroundings associated with an airport in some embodiments.

In some embodiments, the weather radar system 102 may operate in a weather sense mode until approach or landing. During approach or landing, the weather radar system 102 alternatively performs radar data gathering for sensing of the external surroundings, radar data gathering for weather sensing, and radar data gathering for wind shear detection. In some embodiments, during approach or landing, the weather radar system 102 alternatively performs radar data gathering for sensing of external surroundings, and radar data gathering for wind shear detection or other hazard detection. During approach or landing, weather radar system 102 alternatively performs radar data gathering for sensing of external surroundings, and radar data gathering for weather sensing in some embodiments. In some embodiments, weather sensing operations are suspended during approach and landing.

The scope of this disclosure should be determined by the claims, their legal equivalents and the fact that it fully encompasses other embodiments which may become apparent to those skilled in the art. All structural, electrical and functional equivalents to the elements of the above-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims.

Embodiments of the inventive concepts disclosed herein have been described with reference to drawings. The drawings illustrate certain details of specific embodiments that implement the systems and methods and programs of the present disclosure. However, describing the embodiments with drawings should not be construed as imposing any limitations that may be present in the drawings. The present disclosure contemplates methods, systems and program products on any machine-readable media for accomplishing its operations. Embodiments of the inventive concepts disclosed herein may be implemented using an existing computer processor, or by a special purpose computer processor incorporated for this or another purpose or by a hardwired system.

As noted above, embodiments within the scope of the inventive concepts disclosed herein include program products comprising non-transitory machine-readable media for carrying or having machine-executable instructions or data structures stored thereon. Such machine-readable media may be any available media that may be accessed by a computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a computer or other machine with a processor. Thus, any such a connection is properly termed a machine-readable medium. Combinations of the above are also included within the scope of machine-readable media. Machine-executable instructions comprise, for example, instructions and data which cause processor to perform a certain function or group of functions.

Embodiments in the inventive concepts disclosed herein have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments in the present disclosure may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments in the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. User interfaces, as described herein, may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter.

While the exemplary embodiments illustrated in the figures and described above are presently preferred, it should be understood that these embodiments are offered by way of example only. Other embodiments may include, for example, structures with different data mapping or different data. The disclosed subject matter is not limited to a particular embodiment, but extends to various modifications, combinations, and permutations that nevertheless fall within the scope and spirit of the appended claims.

What is claimed is:

1. An airborne weather radar system used for enhanced vision, comprising:
an antenna; and
a control circuit configured to provide radar beams via the antenna toward external surroundings and configured to receive radar returns, wherein the control circuit is configured to process the radar returns to provide image data associated with the external surroundings, wherein the weather radar system has increased range resolution and angular resolution when used for enhanced vision of external scene topography than when used for weather radar sensing functions, the control circuit configured to transmit successive pulses with discrete increasing frequency steps such that radar returns from clutter in an ambiguous range are different from radar returns from targets, the control circuit configured to reject the radar returns from clutter in the ambiguous range, the radar beams being in the X-band or the C-band, the image data being for providing a visual image of external scene topography to a pilot.

2. The system of claim 1, wherein the angular resolution is increased using a beam sharpening technique and deconvolution of a beam point spread function.

3. The system of claim 1, wherein the antenna is a switched aperture antenna, and the control circuit is further configured to process the radar returns to determine a high resolution estimate of a target angle relative to a bore site of the antenna based on switching between transmitting and receiving on a full aperture and transmitting on the full aperture while receiving on a partial aperture.

4. The system of claim 1, wherein the control circuit is configured to provide a perspective enhanced image as the visual image on a display in response to the image data.

5. The system of claim 1, wherein the radar beams are provided as separate pulses with discrete increasing frequency steps.

6. The system of claim 5, wherein the frequency steps hop over restricted or undesired frequencies.

7. A method of providing a real time sensor image, the method comprising:
receiving radar returns from an X-band or C-band airborne weather radar system, the X-band or C-band airborne weather radar system including a switched aperture antenna, wherein the radar returns can be processed to have increased range resolution and angular resolution when used for providing a real time sensor image of external scene topography than when used for weather radar sensing functions;

processing the radar returns to determine a high resolution estimate of a target angle relative to a bore site of the antenna based on switching between transmitting and receiving on a full aperture and transmitting on the full aperture while receiving on a partial aperture; and filtering the radar returns to identify areas having a reflectivity lower than a predetermined value to provide a visual image of the external scene topography based on the radar returns.

8. The method of claim 7, wherein the radar returns of the X-band or C-band airborne weather radar system comprise a switched aperture, sequential lobing or monopulse weather radar system.

9. The method of claim 7, further comprising displaying an aircraft situation display image on a head down display using the visual image.

10. The method of claim 7, further comprising providing radar beams associated with the radar returns, the radar beams are provided using beam sharpening techniques.

11. The method of claim 10, wherein the beam sharpening techniques comprise a sub-aperture or split aperture technique, the method further comprising using a complex conjugate method to remove Doppler-induced phase changes by cancellation to determine the target angle based on a change in phase center.

12. The method of claim 10, wherein the radar beams are provided using ultra wide band pulses, intra pulse compression, or inter pulse compression.

13. The method of claim 12, wherein the radar beams are provided using stepped frequency compression.

14. An enhanced vision system, comprising:

a weather radar system configured to enhance resolution in range when used for providing an enhanced image of a runway environment than when used for weather radar sensing functions, wherein the weather radar system generates image data representative of the runway environment associated radar returns received by the weather radar system, the radar returns being in an X-band or a C-band, wherein the weather radar system is configured to transmit successive pulses with discrete increasing frequency steps such that radar returns from clutter in an ambiguous range are different from radar returns from targets, the weather radar system configured to reject the radar returns from clutter in the ambiguous range; and a display in communication with the weather radar system and configured to display an image associated with the radar returns.

15. The system of claim 14, wherein the weather radar system includes processing electronics that are configured to provide increased angular resolution using beam sharpening.

16. The system of claim 14, wherein the display is a head down display or head up display.

17. The system of claim 14, wherein the enhanced vision system is used as an enhanced flight vision system.

* * * * *